(12) United States Patent  
Arends

(10) Patent No.: US 6,393,942 B1
(45) Date of Patent: May 28, 2002

(54) METHOD OF DRIVING EJECTOR PINS TO EJECT FORMED PARTS

(75) Inventor: Albert W. Arends, Gladwin, MI (US)

(73) Assignee: Brown Machine, LLC, Beaverton, MI (US)

( * ) Notice: Subject to any disclaimer, the term of this patent is extended or adjusted under 35 U.S.C. 154(b) by 0 days.

(21) Appl. No.: 09/965,424

(22) Filed: Sep. 27, 2001

Related U.S. Application Data

(60) Provisional application No. 60/237,338, filed on Sep. 29, 2000.

(51) Int. Cl.$^7$ ................................................ F16C 3/04
(52) U.S. Cl. ............................... 74/595; 83/529; 72/448
(58) Field of Search ..................... 74/595–602; 19/267; 221/33, 45, 46, 36, 40, 282, 253; 83/433, 456.5, 439, 649, 529; 100/257; 72/448

(56) References Cited

U.S. PATENT DOCUMENTS

| | | | | |
|---|---|---|---|---|
| 3,777,504 A | * | 12/1973 | Marchi | ............................ 62/73 |
| 4,105,386 A | * | 8/1978 | Thiel et al. | .................. 425/217 |
| 4,502,588 A | * | 3/1985 | Whiteside et al. | .......... 198/409 |
| 4,966,054 A | * | 10/1990 | Beck | ............................... 76/4 |
| 5,121,735 A | * | 6/1992 | Hancock | ......................... 124/7 |
| 5,225,213 A | * | 7/1993 | Brown et al. | ................ 425/292 |
| 5,540,035 A | * | 7/1996 | Plahm et al. | .................. 53/451 |
| 5,964,134 A | * | 10/1999 | Arends | ........................... 83/13 |
| 5,980,231 A | * | 11/1999 | Arends et al. | ............... 425/397 |
| 6,055,904 A | * | 5/2000 | Chun et al. | .................. 100/257 |
| 6,109,472 A | * | 8/2000 | Gibier | .......................... 221/33 |
| 6,154,931 A | * | 12/2000 | Corrales | ....................... 19/267 |

* cited by examiner

Primary Examiner—Vinh T. Luong
(74) Attorney, Agent, or Firm—John R. Benefiel

(57) ABSTRACT

A method of driving part ejector pins at a high cycle rate by a reversible servo motor rotating a crank unidirectionally to advance a pin mounting structure from a retracted position to an advanced eject position, and back to the retracted position, and reversing the motor to repeat the cycle with only a single motor reversal.

2 Claims, 2 Drawing Sheets

METHOD OF DRIVING EJECTOR PINS TO EJECT FORMED PARTS

RELATED CROSS-REFERENCE APPLICATION

This application claims benefit of U.S. provisional Ser. No. 60/237,338, filed Sep. 29, 2001.

BACKGROUND OF THE INVENTION

This invention concerns ejector mechanisms which are used to eject formed parts from tooling used in their manufacture. In thermoforming parts, a well known process is to vacuum form an array of cups into a single sheet of plastic. The formed sheet is then transferred into a trim die where the cups are cut free from the rest of the sheet and ejected into a stacking mechanism and transferred as a stack for further processing.

The ejector comprises an array of pins held on a member, the pins advanced into the parts after die cutting is complete the same from the sheet to push the cup free of the trim die. Such ejection in the past has been typically accomplished by air cylinders cycling the pin motion. Production speeds have greatly increased in recent years, and reversing servo motors driving slider crank mechanical movements have been used to increase the ejector cycle rate. In this arrangement, the servo motor drives a crank which has an arm pinned to one end of a link, the link pinned at the other end to a slider mounting the ejector pins.

The servo motor rotates the crank to advance the slider to a maximum advance or eject position, reverses, and then retracts and reverses again to begin the next cycle. Thus, each cycle requires two reversals of the servo motor.

This arrangement has worked satisfactorily despite the need for two servo motor reversals, and offered each changes in the retract and advanced positions to adapt to tooling changes. However, because the demand for even higher cycle rates has grown, this arrangement has been found to be deficient as being not capable of executing even more rapid cycle rates now desired, primarily due to the need to reverse the motor twice for each ejection cycle.

It is an object of the present invention to provide a part ejector of the type operated by a reversible servo motor which is capable of higher cycle rates than the prior reversible servo motor driven part ejectors.

SUMMARY OF THE INVENTION

The above recited objects as well as other objects which will become apparent upon a reading of the following specification and claims are achieved by a method for driving part ejectors in which only a single reversal of the servo motor is required per ejector cycle. This is achieved by continuing to advance the servo motor unidirectionally past the point at which the ejector reaches its maximum travel at the crank dead center position, retracting the ejector pins by continued rotational advance of the servo motor in the same direction, the crank-slider causing retraction of the slider to a retracted position, where the servo motor is reversed preparatory to the next cycle. Thus, only a single reversal of the servo motor is required per ejector cycle.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
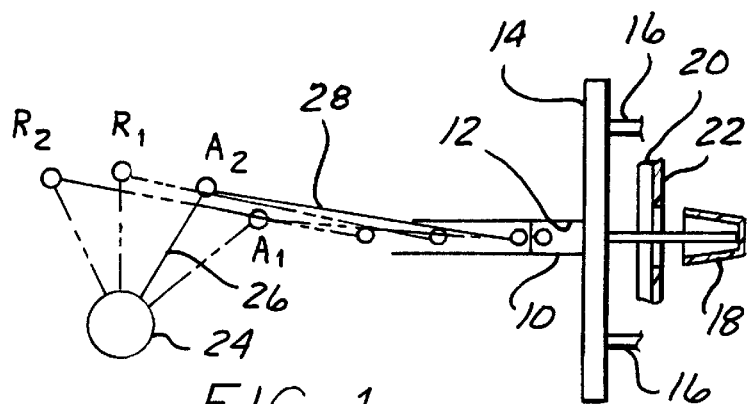
FIG. 1 is a diagram of a prior art ejector mechanism.
Figure 2:
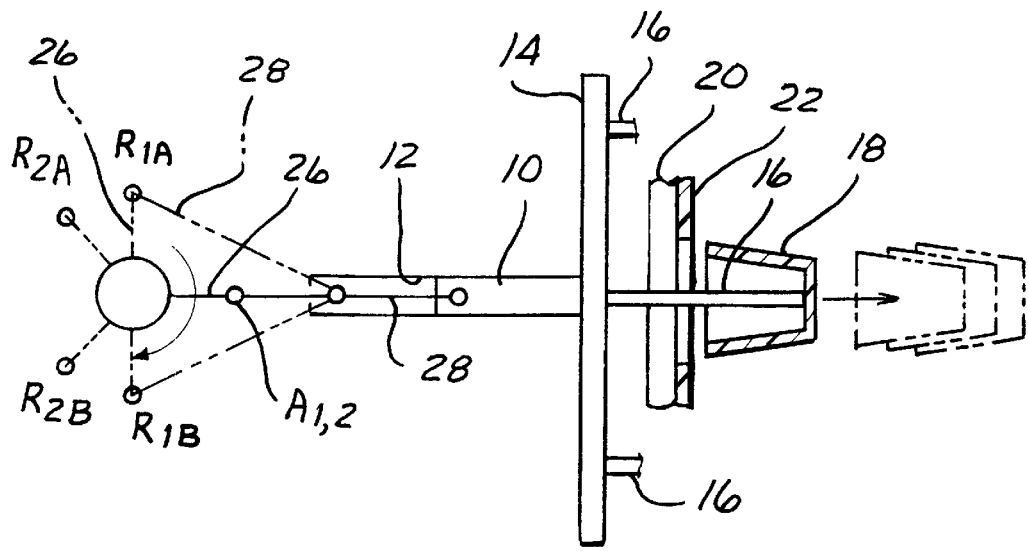
FIG. 2 is a diagram of the ejector mechanism according to the present invention.

Referring to FIG. 1, a prior art ejector mechanism includes a slider 10 mounted for reciprocation in a bearing guide 12. An ejector pin support beam structure 14 fixed to the slider 10 has a plurality of ejector pins 16 projecting therefrom (only one shown completely). In the advance position shown, the ejector pins 16 has caused molded parts 18, here depicted as a disposable cup, to be ejected away as shown from tooling 20 and the remaining part of a sheet 22 from which the parts are formed.

A crank 24 has a crank arm 26 pinned to one end of a connecting link 28, pinned at the other end to the slider 10, thus forming a slider-crank mechanism.

The crank 24 is oscillated by a reversible servo motor (not shown) between a retracted position $R_1$ and advanced position $A_1$ whereat ejection occurs. Thus, the crank 24 is reversed at the retracted position $R_1$ and advanced position $A_1$ for each ejection cycle.

The end points $R_1$, $A_1$ can be readily adjusted, by controlling the servo motor to position the crank arm at another retracted position $R_2$ and advanced position $A_2$ as required for a given tooling-part set up.

According to the method of the present invention, the servo motor is controlled to drive the crank 26 unidirectionally from a first angular position R-1A corresponding to the retracted position of the pin mounting structure 14 through an advanced position A-1 at the dead center position of the crank 24 to a second retracted position R-1B, 180° from the first retracted position R-1A.

The crank 24 is then reversed and driven unidirectionally back to R-1A, passing through the second advanced or ejection position A-2 which is the same as ejection position A-1. The ejector pin support piece 14 is reciprocated between corresponding retracted and advanced positions, whereat the pins 16 push the parts 18 into a stacking mechanism (not shown), as indicated.

Thus, each eject cycle requires only a single reversal of the servo motor, allowing higher ejection cycle rates to be achieved. It is noted that by merely changing the servo motor controls other retracted positions R-2A, R-2B can be set. However, the advanced positions A-1, 2 (and the stroke) cannot be so changed, necessitating relocating of the tooling with respect to the ejector.

Figure 3:
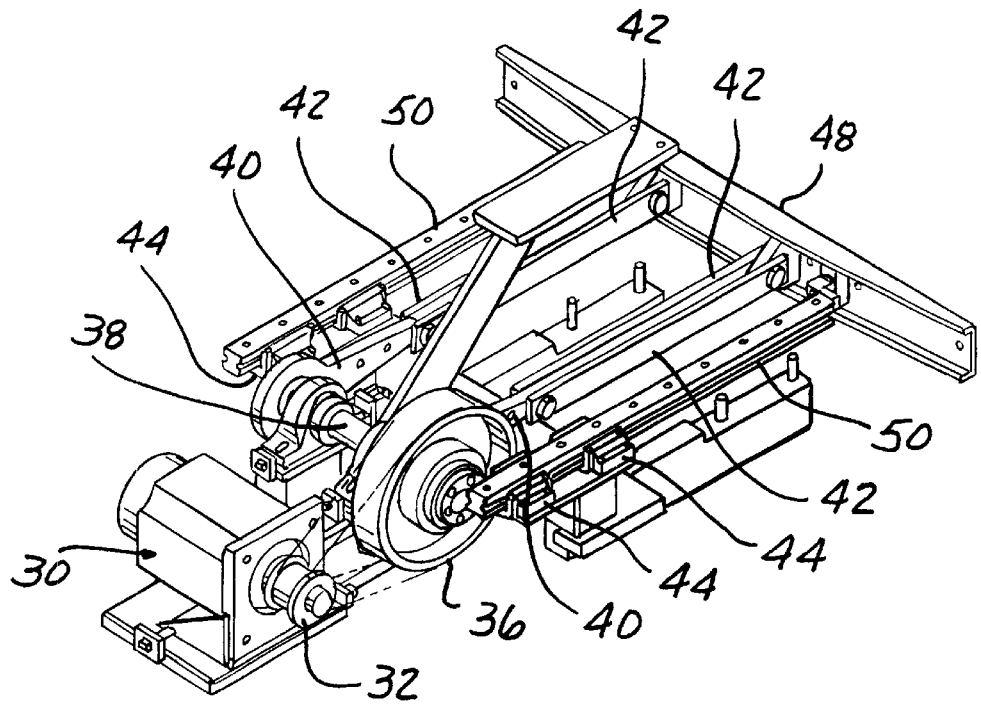
FIG. 3 is a perspective view of a servo motor-slider crank mechanism utilized in the present invention.
Figure 4:
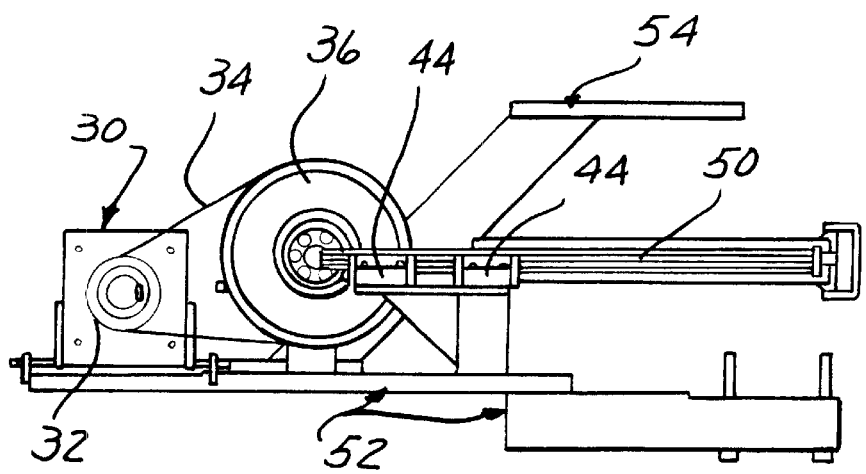
FIG. 4 is a side view of the servo motor-slider crank mechanism shown in FIG. 3.

FIGS. 3 and 4 illustrate an ejector mechanism enabling the practice of the invention.

A servo motor-gear unit 30 oscillates a belt pulley wheel 32, driving a belt 34 passing around a larger belt pulley wheel 36.

A crank shaft 38 is thereby oscillated to oscillate a pair of crank arms 40.

The outer end of the crank arms 40 are pinned to respective connecting links 42 each pinned at their opposite end to an ejector pin mounting structure including piece 48.

Slider bars 50 are included in the pin mounting structure to the ejector pin mounting piece 48, guided in linear bearings 44, to constrain the piece 48 to linear motion.

Mounting structures 52, 54 are also provided.

What is claimed is:

1. A method of driving ejector pins to eject parts from tooling of a part forming apparatus, including the steps of:

mounting ejector pins to a slidably mounted pin mounting structure located with respect to said tooling so as to engage and eject said parts with said pins when said structure is moved to an advanced position from a retracted position;

reciprocating said structure by oscillating a crank having a crank arm pinned to one end of a connecting link, said connecting link pinned at the other end to said pin mounting structure;

said step of oscillating said crank comprising the steps of rotating said crank unidirectionally with a motor from a first angular position corresponding to said retracted position of said pin mounting structure through a crank dead center position corresponding to said advanced position of said pin mounting structure, to a second angular position 180° past said first angular position, also corresponding to said retracted position of said pin mounting structure; and reversing rotation of said motor to rotate said crank and crank arm back through said crank dead center position to said first angular position, whereby only a single reversal of said motor produces an advance and retraction of said ejector pins.

2. The method according to claim 1 wherein said crank is rotated by a reversible servo motor.

* * * * *